(12) United States Patent
Qi et al.

(10) Patent No.: US 8,404,201 B2
(45) Date of Patent: Mar. 26, 2013

(54) MN, CE AND ZR MIXED OXIDES OXIDATION CATALYST

(75) Inventors: Gongshin Qi, Troy, MI (US); Wei Li, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/248,315

(22) Filed: Sep. 29, 2011

(65) Prior Publication Data

US 2012/0036834 A1 Feb. 16, 2012

Related U.S. Application Data

(63) Continuation-in-part of application No. 12/853,357, filed on Aug. 10, 2010, now Pat. No. 8,057,767.

(51) Int. Cl.
*B01D 53/56* (2006.01)
*B01D 53/94* (2006.01)
*C01B 21/36* (2006.01)

(52) U.S. Cl. ............... 423/213.2; 423/213.5; 423/239.1; 423/245.3; 423/247; 423/400; 423/402; 423/404; 60/299

(58) Field of Classification Search ............... 423/213.2, 423/213.5, 239.1, 245.3, 247, 400, 402, 404; 60/299
See application file for complete search history.

(56) References Cited

U.S. PATENT DOCUMENTS

| 6,548,032 B1 * | 4/2003 | Barthe et al. | 423/213.2 |
| 8,057,767 B1 * | 11/2011 | Qi et al. | 423/213.2 |
| 2009/0038297 A1 * | 2/2009 | Nair et al. | 60/299 |

OTHER PUBLICATIONS

Xingfu Tang, et al.; MnOx-CeO2 mixed oxide catalysts for complete oxidation of formaldehyde: Effect of preparation method and calcination temperature; Applied Catalysts B: Environmental 62 (2006); pp. 265-273.

* cited by examiner

*Primary Examiner* — Timothy Vanoy
(74) *Attorney, Agent, or Firm* — Reising Ethington P.C.

(57) ABSTRACT

The oxidation of nitrogen oxide (NO) in an oxygen-containing exhaust gas flow from a diesel or other lean-burn engine may be catalyzed using particles of co-precipitated and calcined manganese (Mn), cerium (Ce) and zirconium (Zr) mixed oxides. In preferred embodiments, the molar ratios of Mn, Ce and Zr to the total amount of base metals in the ternary mixed oxide catalyst are in the range of 0.25-0.35, 0.40-0.50 and 0.20-0.25, respectively. Further, this ternary mixed oxide catalyst is less susceptible to sulfur poisoning than previously-disclosed binary mixed oxide catalysts. The ternary mixed oxide catalyst may also be regenerated—and the inhibiting effect of $SO_2$ reversed—by briefly exposing the catalyst to a reducing exhaust gas environment.

11 Claims, 3 Drawing Sheets

MN, CE AND ZR MIXED OXIDES OXIDATION CATALYST

This application is a Continuation-in-Part of our U.S. patent application Ser. No. 12/853,357, now U.S. Pat. No. 8,057,767 titled "Base Metal Oxides Oxidation Catalyst," filed on Aug. 10, 2010 and assigned to the assignee of this invention, the contents of which are incorporated herein by reference.

TECHNICAL FIELD

This disclosure pertains to the catalyzed oxidation of nitrogen oxide (NO) to nitrogen dioxide ($NO_2$) in an exhaust flow from a lean-burn engine. More specifically, this disclosure pertains to the use of finely divided particles of co-precipitated and calcined manganese (Mn), cerium (Ce) and zirconium (Zr) mixed oxides for catalysis of such oxidation reactions.

BACKGROUND OF THE INVENTION

Diesel engines, some gasoline fueled engines and many hydrocarbon-fueled power plants are operated at higher than stoichiometric air-to-fuel mass ratios for improved fuel economy. The hot exhaust gas produced by such lean-burn engines generally contains a relatively high concentration of oxygen (about one to ten percent by volume) and water, as well as unwanted gaseous emissions that may need to be converted to more innocuous substances before being discharged to the atmosphere. The gaseous emissions primarily targeted for abatement include carbon monoxide (CO), unburned and partially burned hydrocarbons (HC), and nitrogen oxide compounds ($NO_X$). The $NO_X$ constituent in the exhaust gas produced by a lean-burn engine comprises mostly NO (greater than 90 mol %) with some $NO_2$ (less than 10 mol %) and nominal amounts of $N_2O$. To the extent that the hydrocarbon fuel contains sulfur, the exhaust gas may also contain sulfur dioxide ($SO_2$).

Exhaust gas treatment systems that include specially catalyzed flow-through reactors are commonly used to effectively treat exhaust gas flows with variable concentrations of CO, HC and $NO_X$. In general, these treatment systems—and the catalyst materials therein—are designed to promote (1) the oxidation of CO to $CO_2$, (2) the oxidation of HC to $CO_2$ and water, and (3) the reduction of $NO_X$ to $N_2$ and water. However, the high amounts of oxygen in the exhaust gas produced by a lean-burn engine may inhibit the catalytic reduction of $NO_X$ to $N_2$ in commercially-available treatment systems. But, it is found that when much of the NO in an $NO_X$-containing exhaust gas flow is first oxidized to $NO_2$, the $NO_X$ constituency can more readily be reduced to $N_2$ and water by commercially-available $NO_X$ reduction catalysts. Accordingly, the subsequent $NO_X$ to $N_2$ conversion efficiency of such treatment systems can be enhanced by incorporating an NO oxidation catalyst into the treatment system upstream of the $NO_X$ reduction catalyst.

The above identified co-pending patent application discloses mixtures of co-precipitated and calcined base metal oxides that may be prepared as catalysts and used for the effective oxidation of CO to $CO_2$, NO to $NO_2$ and HC to $CO_2$ and water in an oxygen-rich exhaust flow produced by a lean-burn engine. In one embodiment, a ternary mixture of base metal oxides including manganese (Mn) oxide, cerium (Ce) oxide and zirconium (Zr) oxide is prepared for catalysis of such oxidation reactions. It is disclosed that the concentration of manganese in these base metal oxide mixtures may vary, for example from about five mole percent to about ninety mole percent, depending on the catalyst application.

In the above identified parent application, three exemplary binary particulate mixtures comprising $MnO_X$ and one of $CeO_2$, $ZrO_2$ and $Y_2O_3$ are prepared and used to promote the oxidation of NO, CO and $C_3$ hydrocarbons in a synthetic oxygen and water containing gas stream. In these illustrative examples, each of the binary catalyst mixtures consist of equal molar parts $MnO_X$ and $CeO_2$, $ZrO_2$ or $Y_2O_3$. Such binary catalyst mixtures were shown to effectively oxidize NO, CO and low-molecular weight hydrocarbons in the synthetic oxygen and water containing gas stream. The oxidation reactions were found to be effective at temperatures in the range of about 150° C. to about 450° C. and at volumetric gas flow rates experienced in the exhaust flow from a diesel or lean-burn engine.

SUMMARY OF THE INVENTION

Now, it is found that the NO to $NO_2$ oxidation activity of the previously-disclosed, co-precipitated and calcined, ternary manganese (Mn), cerium (Ce) and zirconium (Zr) mixed oxides catalyst can be improved by optimizing the proportions of Mn, Ce and Zr in the catalyst. The optimal proportions of these base metals in the ternary mixed oxide catalyst are obtained by controlling the amount of each metal nitrate dissolved in a common solution from which mixed hydroxides of Mn, Ce and Zr are co-precipitated. The co-precipitated mixed hydroxides are then calcined to form mixed oxides of Mn, Ce and Zr. During calcination, the mixed oxides crystallize and it is believed that some of the manganese and zirconium ions become incorporated into ceria lattices, leading to the formation of a solid solution of manganese, cerium and zirconium mixed oxides.

The co-precipitation and calcination methods of the present invention lead to the formation of a ternary mixed oxide catalyst with the following molar ratios: Mn/(Mn—Ce—Zr)=0.25-0.35, Ce/(Mn—Ce—Zr)=0.40-0.50 and Zr/(Mn—Ce—Zr)=0.20-0.25, with the sum of the molar ratios of Mn, Ce and Zr equal to 1. The oxygen content, which is represented as "X" in the chemical formula, may fluctuate with variations in the proportion of Mn in the catalyst due to the several possible oxidation states of manganese oxide (e.g., +2, +3 and +4).

The ternary mixed oxide catalyst of the present invention can effectively oxidize a significant portion of NO to $NO_2$ in an oxygen-rich exhaust gas flow from a lean-burn engine. In addition, the NO to $NO_2$ conversion activity of this catalyst is higher than that of the previously-prepared binary mixed oxide catalysts. As discussed above in this specification, the overall $NO_X$ to $N_2$ conversion performance of exhaust gas treatment systems for lean-burn engines can be enhanced if some NO in the exhaust gas is oxidized to $NO_2$ before the $NO_X$-constituent is catalytically reduced. Therefore, use of this ternary mixed oxide oxidation catalyst in such treatment systems can improve the subsequent $NO_X$ reduction activity of downstream catalytic reduction systems. Thus, the ternary mixed oxide oxidation catalyst of the present invention can be used to improve the overall $NO_X$ to $N_2$ conversion performance of exhaust gas treatment systems for lean-burn engines.

Commonly-used downstream catalytic reduction systems for lean-burn engines include a selective catalytic reduction (SCR) system and a lean $NO_X$ trap (LNT). An SCR operates by injecting a reductant material, such as ammonia or unburned fuel constituents, into the exhaust gas flow before it is passed in contact with a reduction catalyst. The reduction catalyst is configured to reduce $NO_X$ to $N_2$ in the exhaust flow in the presence of the reductant additive. In an LNT system, a collection of catalyst materials are used to cooperatively reduce $NO_X$ to $N_2$ in the exhaust flow when combined with an engine that cyclically operates in a fuel-lean mode and a fuel-rich mode. When the engine is operated in the fuel-rich mode, fuel constituents in the exhaust gas create a reducing environment in the exhaust gas and the $NO_X$ is then reduced to $N_2$ in the presence of a reduction catalyst. The ternary mixed oxide oxidation catalyst of the present invention benefits both of these treatment systems by increasing the amount of $NO_2$ in the exhaust gas and thereby boosting the $NO_X$ reduction activity of the catalyst materials therein.

In preferred embodiments of this invention, the exhaust gas flow from a lean-burn engine is exposed to fine particles of the ternary mixed oxide catalyst to promote the oxidation of NO to $NO_2$ in an exhaust gas treatment system for a lean-burn engine. The exhaust flow may be exposed to the ternary mixed oxide catalyst particles within, for example, a catalyzed flow-through reactor that forms part of the exhaust gas treatment system.

Further, the ternary mixed oxide catalyst of the present invention is less susceptible to sulfur poisoning than the previously-prepared binary mixed oxide catalysts. Some hydrocarbon fuels contain sulfur, and engines that operate by burning such sulfur-containing fuels produce exhaust flows that contain sulfur dioxide ($SO_2$). When base metal mixed oxide catalysts are exposed to an $SO_2$-containing exhaust flow, the catalyst particles may react with $SO_2$ in the hot exhaust flow to form sulfate compounds, such as $MnSO_4$. After prolonged exposure to an $SO_2$-containing exhaust flow, these sulfate compounds may accumulate on the catalyst particles and inhibit their NO oxidation activity. The inhibiting effect of $SO_2$ on catalyst activity is known as sulfur poisoning. In practice, the ternary mixed oxide catalyst of the present invention is found to display increased resistance to such sulfur poisoning.

It has also been found that sulfur-poisoned base metal mixed oxide catalysts can be regenerated—and the inhibiting effect of $SO_2$ reversed—by briefly exposing the catalysts to a reducing exhaust gas environment. Lean-burn engines primarily operate by burning a mixture of air and fuel in which the air-to-fuel mass ratio of the mixture is greater than the stoichiometric air-to-fuel ratio (lean mixture). The high-oxygen content exhaust gas typically produced by lean-burn engines creates an oxidizing exhaust gas environment. A reducing exhaust gas environment can be created, for example, by briefly operating the engine to burn a mixture of air and fuel with an air-to-fuel mass ratio that is equal to or less than the stoichiometric ratio (rich mixture). The low-oxygen content exhaust gas from rich-burn engines typically contains an increased amount of unburned and partially burned hydrocarbons as well as hydrogen ($H_2$) and carbon monoxide (CO), which creates a reducing exhaust gas environment. When accumulated sulfate compounds on the catalyst particles are exposed to the reducing exhaust gas environment, the sulfate compounds become unstable and decompose to $SO_2$, carbon dioxide ($CO_2$) and water ($H_2O$), thereby regenerating the catalyst particles for further use. Such regeneration can occur at relatively low temperatures, for example in the range of about 350 to 700° C.

Other objects and advantages of the invention will be apparent from a further description of preferred (but not-limiting) embodiments of the invention.

DESCRIPTION OF PREFERRED EMBODIMENTS

Figure 1:
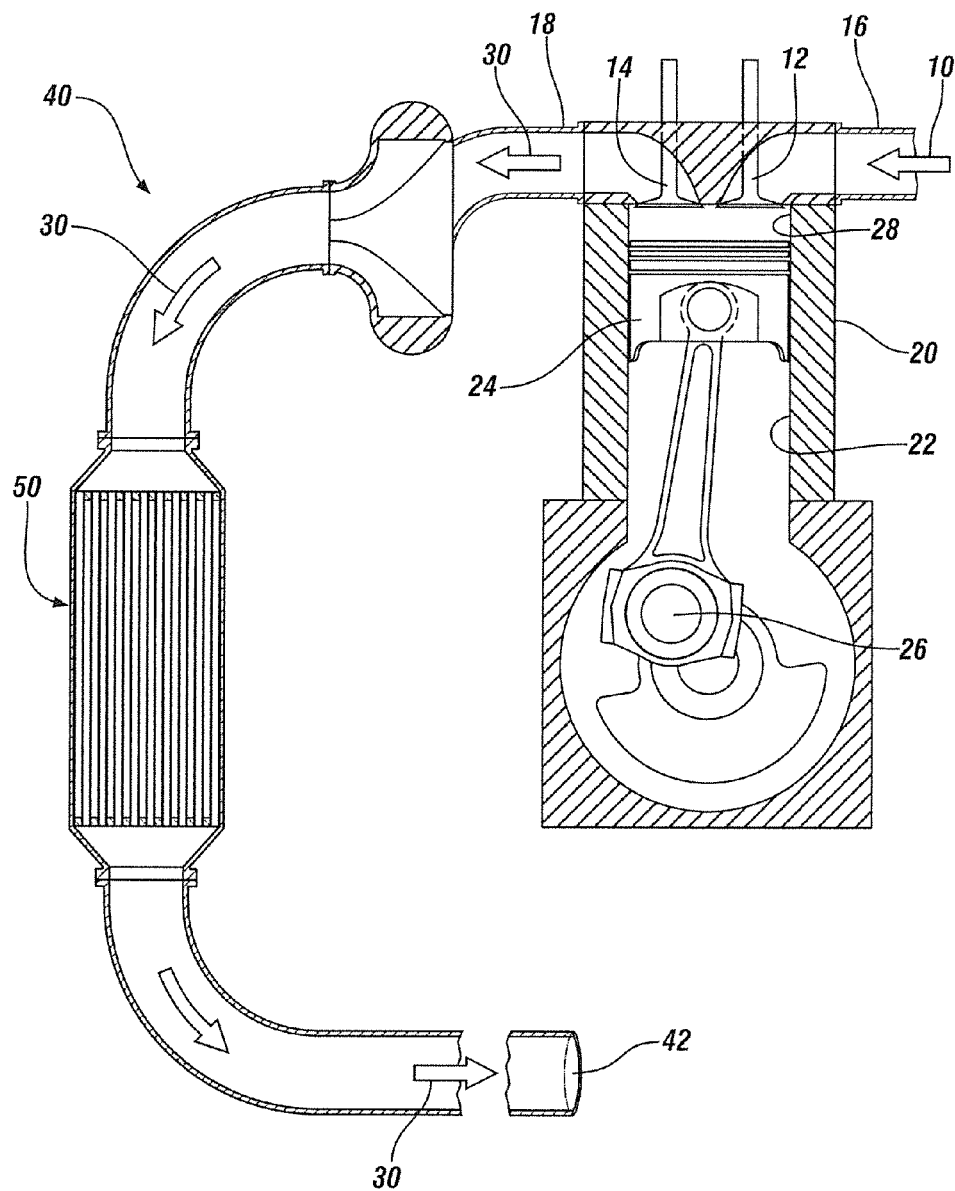
FIG. 1 is a schematic illustration of a cross-section of a single cylinder of a lean-burn engine that is coupled to an exhaust system. The exhaust system includes a specially catalyzed flow-through reactor for treatment of the exhaust gas produced by the engine.

It is found that a catalyst comprising particles of co-precipitated and calcined manganese, cerium and zirconium mixed oxides can be used as part of an exhaust gas treatment system for a lean-burn engine to effectively oxidize a significant portion of NO to $NO_2$ in the oxygen-rich exhaust gas flow. And the conversion of NO to $NO_2$ in the treatment system can facilitate downstream catalyzed $NO_X$ reduction reactions. In preferred embodiments of this invention, the molar ratios of each base metal to the total base metal amount in the catalyst hare: Mn/(Mn—Ce—Zr)=0.25-0.35, Ce/(Mn—Ce—Zr)=0.40-0.50 and Zr/(Mn—Ce—Zr)=0.20-0.25. More preferably, the molar ratios are: Mn/(Mn—Ce—Zr)=0.28-0.32, Ce/(Mn—Ce—Zr)=0.45-0.48 and Zr/(Mn—Ce—Zr)=0.22-0.24.

The optimal proportions of Mn, Ce and Zr in this ternary mixed oxide catalyst are obtained by controlling the amount of each metal ion dissolved in a common solution prior to co-precipitation. As disclosed herein, this precursor solution may be prepared by dissolving metal nitrates of $Mn(NO_3)_2 \cdot 6H_2O$, $Ce(NO_3)_3 \cdot 6H_2O$ and $ZrO(NO_3)_2 \cdot 2H_2O$ in the desired molar ratios in deionized water at room temperature. A precipitating agent, such as ammonia, is added to the precursor solution to increase the pH of the solution and trigger co-precipitation of manganese, cerium and zirconium hydroxides therefrom. It is preferred to precipitate the mixed hydroxides with ammonia because it is found that residual ammonium ions are easily removed in the subsequent calcination process. To ensure complete precipitation of the dissolved metal ions from solution, the precipitate may be further aged in the solution for 2 hours at room temperature.

The solid manganese, cerium and zirconium hydroxide precipitate is then separated from the liquid, washed with deionized water and dried. The solid precipitate may be dried in an oven at 120° C. for 12 hours. The dried precipitate is then calcined to dehydrate the manganese, cerium and zirconium hydroxides and form oxides of the respective base metals. The precipitate may be calcined in air at a temperature of about 500 to 550° C. for 6 hours. During calcination, it is believed that some Mn and Zr ions become incorporated into ceria crystal lattices, leading to the formation of a solid solution of manganese, zirconium and cerium mixed oxides. These Mn and Zr ions may be incorporated substitutionally, by replacing Ce atoms in the lattice, or interstitially, by fitting into spaces between the Ce atoms. The Mn and Zr ions that do not become incorporated into a ceria lattice exist as the stoichiometric compounds of manganese oxide and zirconium oxide.

The term "mixed oxide" is used throughout this specification to mean oxides that may contain cations of more than one base metal element or that the cations may be present in more than one oxidation state. The base metal mixed oxides of the present invention typically contain an anion of oxygen in the oxidation state of $2^-$. The co-precipitated and calcined ternary mixed oxide catalyst of the present invention may be referred to herein as $MnO_X$—$CeO_2$—$ZrO_2$ or as $MnCeZrO_X$.

FIG. 1 is a schematic illustration of a cross-section of a single cylinder of a lean-burn engine in which the engine is coupled to an exhaust system. In practices of this invention, a controlled mixture of air and fuel 10 is delivered to cylinders of an internal combustion engine 20. After combustion of the air and fuel mixture in the cylinders, an exhaust gas flow 30 exits the cylinders and passes through an exhaust system 40 including at least one catalyzed flow-through reactor 50 for the effective oxidation of NO to $NO_2$ in the exhaust gas flow 30.

The multi-cylinder, reciprocating piston, internal combustion engine 20 of the present invention may be a charge compression engine (i.e., diesel engine), a spark ignition direct injection engine (i.e., gasoline engine, which may or may not contain an in-cylinder fuel injector), or a homogeneous charge compression ignition engine. Each of these types of engines includes cylinders 22 (usually four to eight cylinders) that accommodate reciprocating piston heads 24 connected to a crankshaft 26. Located above each piston head 24 is a combustion chamber 28 that receives a mixture of air and fuel 10 through an intake valve 12 at specifically timed intervals. The spark or compression assisted ignition of the air and fuel mixture 10 in the combustion chambers 28 invokes rapid downward linear movement of their respective piston heads 24 to drive rotation of the crankshaft 26. The reactive upward movement of each piston head 24 in each exhaust stroke expels the combustion products from each combustion chamber 28 through an exhaust valve 14.

The engine 20 is supplied with a continuous air flow at a variable mass flow rate responsive to engine performance demands (i.e, pressing and depressing a foot pedal located in the driver-side compartment to affect vehicle speed and acceleration). A calculated quantity of pressurized fuel is intermittently injected into an incoming air flow (not shown) just upstream from the engine 20, as dictated, for example, by an engine control strategy, to produce a mixture of air and fuel that exhibits the instantly desired air to fuel mass ratio. The quantity of fuel injected into the incoming air flow is controlled to maintain a predetermined lean air to fuel mass ratio or a predetermined rich air to fuel mass ratio, or to switch between the two states.

The mixture of air and fuel 10 enters an intake manifold 16 of the internal combustion engine 20 and exits as an exhaust gas flow 30 through the exhaust manifold 18. The intake manifold 16 delivers the air and fuel mixture 10 into the combustion chambers 28 through the intake valve 12 and then to the cylinders 22 of the engine 20. The air and fuel mixture 10 is compressed, heated, and thereby ignited to power the reciprocating piston heads 24 in the cylinders 22 of the engine 20. The spent combustion products (including CO, HC, and $NO_X$) are expelled from the cylinders 22 of the engine 20 by the exhaust strokes of the pistons 24 and into the exhaust manifold 18 through the exhaust valve 14. The exhaust gas flow 30 exits the exhaust manifold 18 and enters the exhaust system 40. The exhaust system 40 communicates the exhaust gas flow 30 to the catalyzed flow-through reactor 50 for the effective oxidation of at least a portion of the NO to $NO_2$. The exhaust system 40 then communicates the exhaust gas flow 30 from the catalyzed flow-through reactor 50 as a treated exhaust flow 30, which is expelled from the exhaust system 40 through a tailpipe 42 to the ambient atmosphere.

Figure 2:
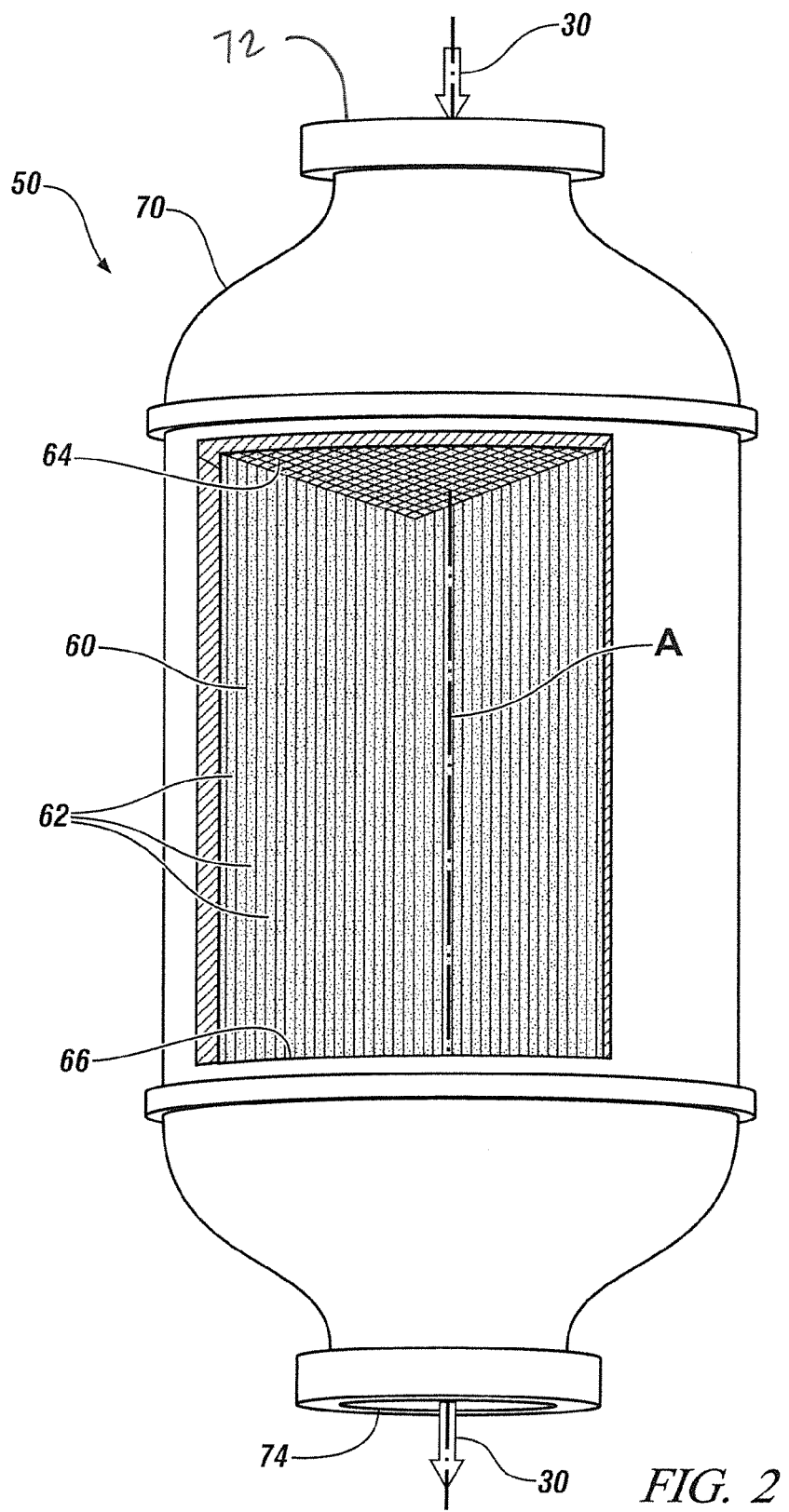
FIG. 2 is a schematic illustration of an exemplary catalyzed flow-through reactor located in the exhaust system shown in FIG. 1.

By way of illustration, a suitable catalyzed flow-through reactor 50 for promoting the oxidation of NO to $NO_2$ by the $MnCeZrO_X$ catalyst of the present invention is shown in FIG. 2. The catalyzed flow-through reactor 50 may be piped within the exhaust system 40, as shown in FIG. 1, to facilitate continuous passage of the exhaust gas flow 30 therethrough. The catalyzed flow-through reactor 50 comprises an alloy steel container 70 shaped with an upstream opening 72 for exhaust gas entry, and a downstream opening 74 for exhaust gas through-flow. The body of the container 70 is often round or elliptical in cross-section and sized to hold a support body 60 upon which particles of the $MnCeZrO_X$ catalyst are dispersed. The exhaust gas flow 30 enters the catalyzed flow-through reactor 50 where it contacts the catalyst particles that are dispersed on the support body 60.

The support body 60 may be an extruded ceramic, honeycomb-shaped monolith with an inlet face 64 and an outlet face 66 transverse to the direction of exhaust gas flow 30 (that is, along the flow axis A). The support body 60 includes several small, square, parallel flow-through channels 62 defined by walls that extend longitudinally from the inlet face 64 to the outlet face 66 of the support body 60. In practices of this invention, fine particles of the $MnCeZrO_X$ oxidation catalyst are deposited on the walls of the small flow-through channels 62 in the form of a thin washcoat layer or layers. The high total surface area of the many channel walls provides sufficient contact surface area between the exhaust gas flow 30 and the catalyst particles for the desired oxidation reactions to occur.

In FIG. 2, a wedge portion of the container 70 and the catalyst-bearing support body 60 have been cut-away to better reveal the many internal channels 62 extending therethrough. Since each channel 62 is small in cross-section for admitting the exhaust gas flow 30, the inlet face 64 of the support body 60 is sized to provide a suitable number of channels 62 to collectively accommodate a desired flow rate for the exhaust gas flow 30. For example, the support body 60 may contain about four-hundred channels 62 per square inch of inlet face 64 cross-sectional area. The thickness of the channel walls is between 0.002 and 0.015 inches. While extruded ceramic, honeycomb-shaped monoliths have proven effective and durable for oxidation catalysts, other catalyst support bodies of different materials may be used.

The oxidation catalysts of the present invention have utility for applications other than the treatment of diesel or gasoline engine exhaust, and may be useful for oxidation of gas-borne oxidizable components generally, such as the exhaust gas produced by compressed natural gas engines, ethanol-fueled engines, compressors, gas turbines, power plants etc.

The exhaust gas may be exposed to other devices or mechanical equipment, not expressly shown in FIG. 1, that may or may not help produce the treated exhaust gas flow 30. These devices include, for example, another oxidation catalyst, a three-way catalyst, a particulate filter, a selective catalytic reduction (SCR) catalyst device, a lean $NO_X$ trap (LNT), an exhaust flow recirculation line, a turbocharger turbine, a muffler, and/or a resonator. Skilled artisans will undoubtedly know of, and understand, these and the many other devices that the exhaust flow could be exposed to.

EXAMPLES

As discussed above, the optimal proportions of Mn, Ce and Zr in the $MnCeZrO_X$ catalyst are obtained by controlling the amount of each metal nitrate used in the co-precipitation process. In these examples, MnCeZrO$_X$ mixed oxides (Mn/(Mn—Ce—Zr)=0.3, molar ratio) and MnCeO$_X$ mixed oxides (Mn/(Mn—Ce)=0.3, molar ratio) are prepared for use as catalysts in powder form.

To prepare the particulate MnCeZrO$_X$ catalyst, metal nitrates of Mn(NO$_3$)$_2$.6H$_2$O, Ce(NO$_3$)$_3$.6H$_2$O and ZrO(NO$_3$)$_2$.2H$_2$O with a molar ratio of 0.3:0.47:0.23 are used. A precursor solution is prepared by dissolving appropriate amounts of the metal nitrates in deionized water at room temperature. An aqueous solution of ammonia is added to the precursor solution until the pH value reaches 10.5 with stirring. The precipitate is further aged at the same temperature for 2 hours in the supernate. After filtration and washing with deionized water, the obtained solid is dried at 120° C. for 12 hours and then calcined at a temperature in the range of about 500 to 550° C. in air for 6 hours.

During co-precipitation and calcination of the mixed oxides, it is believed that some of the manganese and zirconium ions become incorporated into a ceria lattice, leading to the formation of a solid solution between manganese, zirconium and cerium oxides. It is also believed that the formation of the solid solution of manganese, cerium and zirconium mixed oxides is responsible for the high catalytic activity of this oxidation catalyst. Specifically, it is believed that the oxygen transfer mechanisms of these mixed oxides interact synergistically when combined as in the solid solution to effectively activate molecular oxygen in a gas stream.

The particulate MnCeO$_X$ catalyst is prepared as above, except that metal nitrates of Mn(NO$_3$)$_2$.6H$_2$O and Ce(NO$_3$)$_3$.6H$_2$O with a molar ratio of 0.3:0.7 are used.

To prepare these particulate mixed oxides for use as catalysts, catalyst particles are dispersed in a liquid medium to form a washcoating solution. The size of the catalysts particles in the washcoating solution is preferably about 10 to 20 nanometers. In this example, approximately 4 grams of catalyst particles and 15 grams of water are ball milled for 18 hours to form a slurry. Extruded cordierite monolith core samples are immersed in the slurry to dip-coat the cell walls with a thin film of the solution. In these examples, the monolith core samples are ¾ inch diameter by 1 inch length, with 400 cells per square inch (cpsi), a 4 milli-inch wall thickness, and made of cordierite. After washcoating, the catalyst-coated monoliths are dried at 120° C. and calcined at a temperature in the range of 500 to 550° C. for 5 hours in static air.

The catalysts are tested in a quartz tubular reactor operated at atmospheric pressure by passing a gas stream over and through a volume of the catalyst particles contained as washcoat layers on the walls of passages of the monolith samples. The gas stream is fed to the reactor using a series of mass flow controllers. The total feed flow rate is 3.0 liters per minute, corresponding to a space velocity of 25,000 h$^{-1}$. In these and following experiments, the value of space velocity refers to the ratio of the volumetric flow rate of the gas stream (at STP) with respect to the nominal volume of the ceramic monolith (the volume is arbitrarily based on its outer cross-sectional area and length).

The reactor is heated in a tube furnace which controls the temperature just upstream of the catalyst-coated monolith. Thermocouples are used to measure the temperature upstream and downstream of the monolith sample. The reactor outlet stream is analyzed with a Fourier Transform Infrared (FTIR) analyzer (ThermoNicolet NEXUS 670) calibrated at 940 Ton and 165° C. A pressure controller at the outlet of the FTIR is used to maintain the calibration pressure, and the line downstream of the reactor is heated to 165° C. The lines upstream of the reactor are also heated to 165° C. to assure complete vaporization of water.

Example 1

In this example, the NO oxidation activity of the Mn(0.3)CeZrO$_X$ catalyst and the Mn(0.3)CeO$_X$ catalyst is determined at various catalyst temperatures. Before the NO oxidation activity of the freshly-prepared catalysts is measured, the catalyst-coated monoliths are "degreened," or aged. In this step, the reactor is heated to about 750° C. and a gas mixture comprising 10 vol. % H$_2$O and air is fed to the reactor for 1 hour.

To determine the NO oxidation activity of the catalysts at various temperatures, a gas stream comprising 8 vol. % O$_2$, 5 vol. % H$_2$O, 8 vol. % CO$_2$ and 200 ppmv NO with N$_2$ as balance is fed to the reactor and the temperature of the gas feed stream is incrementally increased from 100° C. to 450° C. As stated, the gas stream from the reactor outlet is analyzed with an FTIR. The percent NO to NO$_2$ conversion values are calculated by comparing the concentration of NO and NO$_2$ in the gas stream at both the inlet ([NO]$_{inlet}$) and the outlet ([NO]$_{outlet}$) of the reactor. I.e., Conversion of (%) NO to NO$_2$=[NO]$_{inlet}$/[NO]$_{outlet}$.

Figure 3:
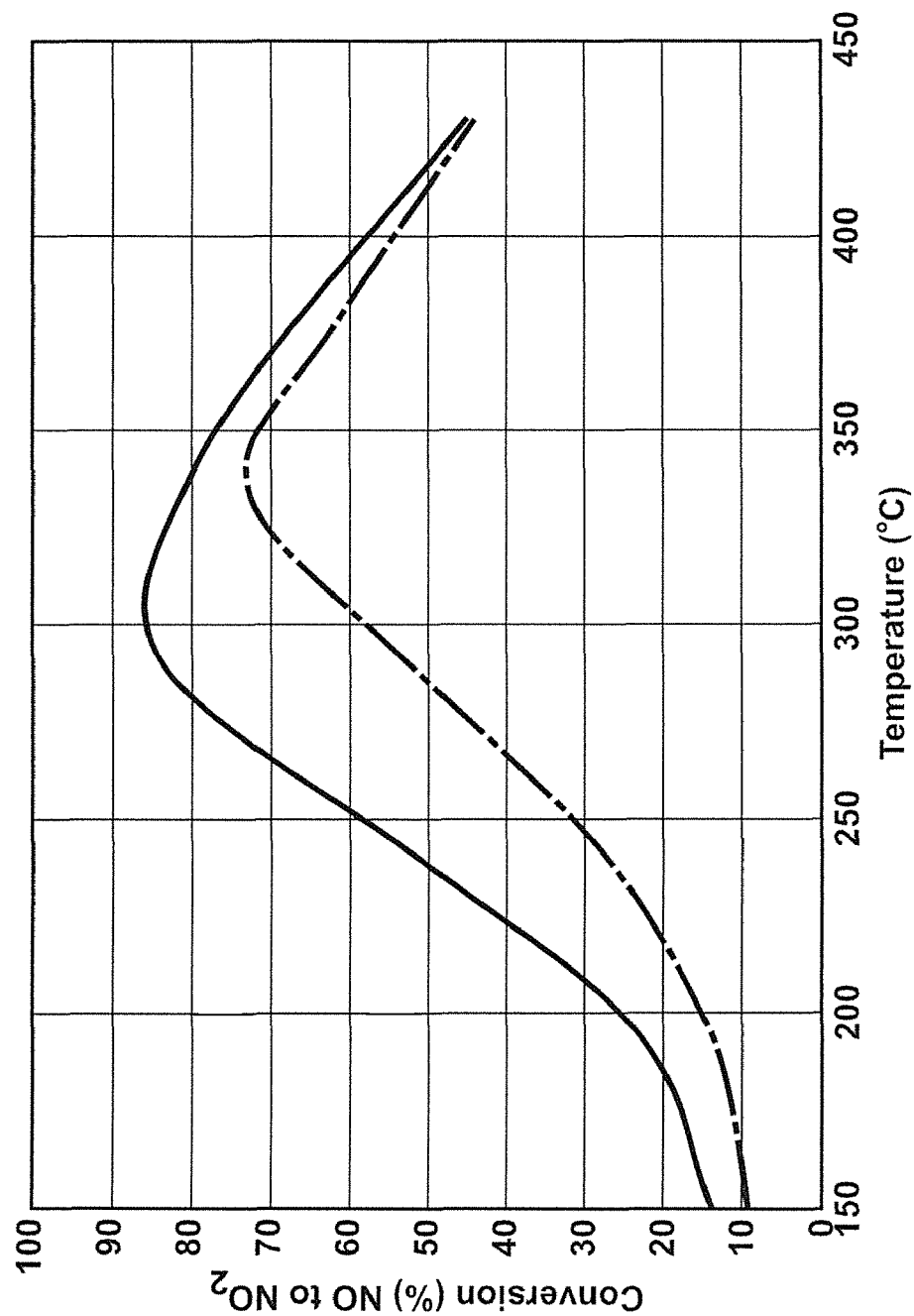
FIG. 3 is a graph of Conversion (%) NO to $NO_2$ vs. Temperature (° C.) comparing the nitrogen oxide (NO) oxidation activity of the ternary mixed oxide (Mn—Ce—Zr) catalyst (solid line) and the previously-disclosed binary (Mn—Ce) mixed oxide catalyst (dashed line) in a gas stream comprising 8 vol. % $O_2$, 5 vol. % $H_2O$, 8 vol. % $CO_2$ and 200 ppmv NO with $N_2$ as balance. Both catalysts were tested in a quartz tubular reactor by passing the gas stream over and through a volume of the catalyst particles dispersed on channel walls of a extruded corderite monolith core sample a washcoat layer. Before testing, the catalyst-coated monoliths were pretreated by heating the reactor to 750° C. and passing a stream of air comprising 10 vol. % $H_2O$ through the reactor for 1 hour.

As shown in FIG. 3, the NO to NO$_2$ oxidation activity of the Mn(0.3)CeZrO$_X$ catalyst (solid line) is greater than that of the Mn(0.3)CeO$_X$ catalyst (dashed line) along the entire temperature range studied. The NO oxidation activity of the Mn(0.3)CeZrO$_X$ oxidation catalyst peaked at a temperature of about 300° C. wherein the catalyst was able to convert approximately 85% of NO present in the gas stream to NO$_2$. The NO oxidation activity of the Mn(0.3)CeO$_X$ catalyst peaked at a temperature of about 340° C. and reached a maximum NO to NO$_2$ conversion of about 73%.

Example 2

In this example, the oxidation catalysts of Mn(0.3)CeZrO$_X$ and Mn(0.3)CeO$_X$ are prepared as above and used to promote the oxidation of NO and NO$_2$ in a gas stream. But, in this example, the sulfur tolerance of the catalysts is determined by exposing the catalysts to a gas stream containing a high-concentration of SO$_2$ (32 ppmv).

The exhaust gas from a diesel or gasoline-fueled engine typically contains only 1-2 ppmv SO$_2$. Therefore, this example is not representative of the actual NO to NO$_2$ oxidation performance that either of these catalysts would likely exhibit if continuously exposed to an SO$_2$-containing exhaust gas from a diesel or gasoline-fueled vehicle. In general, it is expected that both of these oxidation catalysts will perform quite well when exposed to the particularly low amounts of SO$_2$ that are usually present in the exhaust gas from a diesel or gasoline-fueled. However, some engines burn alternative fuels, such as coal, and such fuels may contain much higher amounts of sulfur. Therefore, the sulfur tolerence of these catalysts was tested using a gas stream containing 32 ppmv SO$_2$ to evaluate the NO to NO$_2$ oxidation performance of these catalysts in other exhaust gas environments.

To determine the sulfur tolerance of these catalysts, the catalysts are heated to a temperature of 350° C. and a gas stream comprising 8 vol. % O$_2$, 5 vol. % H$_2$O, 8 vol. % CO$_2$ 200 ppmv NO and 32 ppmv SO$_2$, with N$_2$ as balance is fed to the reactor for 90 minutes. The gas stream from the reactor outlet is continuously analyzed with an FTIR to determine the percent NO to NO$_2$ conversion of each of the catalysts over time.

Initially, both of the catalysts convert about 78% and 68% of the NO to $NO_2$, respectively, in the gas stream fed to the reactor. After 30 minutes, the NO to $NO_2$ conversion of the $Mn(0.3)CeZrO_X$ catalyst is about 68%, while the NO to $NO_2$ conversion of the $Mn(0.3)CeO_X$ catalyst is reduced to about 5%. After 85 minutes, the NO to $NO_2$ oxidation activity of both catalysts reaches a minimum of about 5%.

After 90 minutes, the flow of $SO_2$ in the gas stream and into the reactor was stopped. However, even when the gas stream no longer contained $SO_2$, the NO to $NO_2$ oxidation activity of the $Mn(0.3)CeZrO_X$ catalyst did not improve.

Example 3

After the $Mn(0.3)CeZrO_X$ oxidation catalyst is exposed to an SO2-containing gas steam, as in Example 2, the catalyst may be regenerated by heating the catalyst to about 550° C. and briefly exposing the catalyst to a gas stream comprising 1 vol. % $H_2$ so as to produce a reducing environment in the gas stream. During regeneration, the gas stream did not contain $O_2$.

After regeneration, the NO to $NO_2$ oxidation activity of the $Mn(0.3)CeZrO_X$ catalyst is evaluated in a gas stream comprising 8 vol. % $O_2$, 5 vol. % $H_2O$, 8 vol. % $CO_2$ and 200 ppmv NO with $N_2$ as balance. The regenerated $Mn(0.3)CeZrO_X$ oxidation catalyst is able to convert approximately 50% of NO present in the gas feed stream to $NO_2$.

The sulfur tolerance and regeneration ability of the $Mn(0.3)CeZrO_X$ catalyst suggest that this catalyst may also be used to effectively oxidize CO, HC and $NO_X$ in exhaust gas treatment systems for engines that burn alternative fuels, which may or may not contain high amounts of sulfur. For example, this catalyst may be used in exhaust gas treatment systems of stationary engines that burn coal and thus produce exhaust gas flows with relatively high amounts of $SO_2$.

As discussed above, the $Mn(0.3)CeZrO_X$ catalyst may be regenerated by exposing the catalyst to a reducing exhaust gas environment which can be created by controlling the engine to briefly operate in a fuel-rich mode. However, regeneration of the catalyst need not be performed in the exhaust gas flow at all. If practicable, the catalyst may be removed from the exhaust gas treatment system for regeneration. For example, the catalyst may be removed from the exhaust treatment system when the engine is not operating. Or, another oxidation catalyst may replace the $Mn(0.3)CeZrO_X$ catalyst in the exhaust treatment system while it is being regenerated.

Embodiments of practices of the invention have been presented to illustrate the invention and not to limit its scope.

The invention claimed is:

1. A method of oxidizing nitrogen oxide (NO) to nitrogen dioxide ($NO_2$) in an exhaust gas flow produced by a lean-burn engine, the method comprising:
    passing the exhaust gas flow in contact with particles of an oxidation catalyst for a time sufficient to oxidize at least a portion of NO in the exhaust gas to $NO_2$, the oxidation catalyst consisting essentially of mixed oxides of manganese (Mn), cerium (Ce) and zirconium (Zr), wherein the molar ratio of Mn to Mn—Ce—Zr in the oxidation catalyst is between 0.25 and 0.35.

2. A method of oxidizing as recited in claim 1 wherein the molar ratio of Ce to Zr in the oxidation catalyst is 2:1.

3. A method of oxidizing as recited in claim 1 wherein the molar ratio of Ce to Mn—Ce—Zr in the oxidation catalyst is between 0.40 and 0.50 and the molar ratio of Zr to Mn—Ce—Zr is between 0.20 and 0.25.

4. A method of oxidizing as recited in claim 1 wherein the molar ratio of Mn to Mn—Ce—Zr in the oxidation catalyst is between 0.28 and 0.32, the molar ratio of Ce to Mn—Ce—Zr is between 0.45 and 0.58 and the molar ratio of Zr to Mn—Ce—Zr is between 0.22 and 0.24.

5. A method of oxidizing as recited in claim 1 further comprising:
    preparing the mixed oxides of Mn, Ce and Zr by co-precipitating hydroxides of Mn, Ce and Zr from an aqueous solution with ammonia and calcining the hydroxides at a temperature of about 500° C. to form a solid solution of Mn, Ce and Zr mixed oxides.

6. A method of oxidizing nitrogen oxide (NO) to nitrogen dioxide ($NO_2$) in an exhaust gas flow produced by a lean-burn engine, the method comprising:
    operating the engine to burn a mixture of air and fuel in which a fuel content in the mixture is lean with respect to a stoichiometric air-to-fuel mass ratio;
    passing the exhaust gas flow in contact with an $NO_X$ oxidation catalyst for a period of time sufficient to oxidize substantially all of the NO to $NO_2$; the oxidation catalyst being dispersed on channel walls of an extruded ceramic flow-through support body as a washcoat layer comprising particles of co-precipitated and calcined manganese (Mn), cerium (Ce) and zirconium (Zr) mixed oxides, wherein the molar ratio of Mn to Mn—Ce—Zr in the washcoat layer is between 0.25 and 0.35.

7. A method of oxidizing as recited in claim 6 in which the molar ratio of Ce to Zr in the washcoat layer is 2:1.

8. A method of oxidizing as recited in claim 6 wherein the molar ratio of Ce to Mn—Ce—Zr in the washcoat layer is between 0.40 and 0.50 and the molar ratio of Zr to Mn—Ce—Zr in the washcoat layer is between 0.20 and 0.25.

9. A method of oxidizing as recited in claim 6 wherein the molar ratio of Mn to Mn—Ce—Zr in the washcoat layer is between 0.28 and 0.32, the molar ratio of Ce to Mn—Ce—Zr is between 0.45 and 0.58 and the molar ratio of Zr to Mn—Ce—Zr is between 0.22 and 0.24.

10. A method of oxidizing as recited in claim 6 further comprising:
    passing the exhaust gas flow in contact with a diesel oxidation catalyst (DOC) to oxidize carbon monoxide (CO) and hydrocarbons (HC) in the exhaust flow before the exhaust gas flow is passed in contact with the $NO_X$ oxidation catalyst.

11. A method of oxidizing as recited in claim 6 further comprising:
    passing the exhaust gas flow in contact with an $NO_X$ reduction catalyst system to reduce $NO_X$ to $N_2$ in the exhaust flow.

* * * * *